Dec. 31, 1963
W. F. GRATTAN
3,115,792
AUTOMATIC TRANSMISSION FOR AUTOMOTIVE VEHICLES
Filed Dec. 26, 1961
3 Sheets-Sheet 2
FIG_2
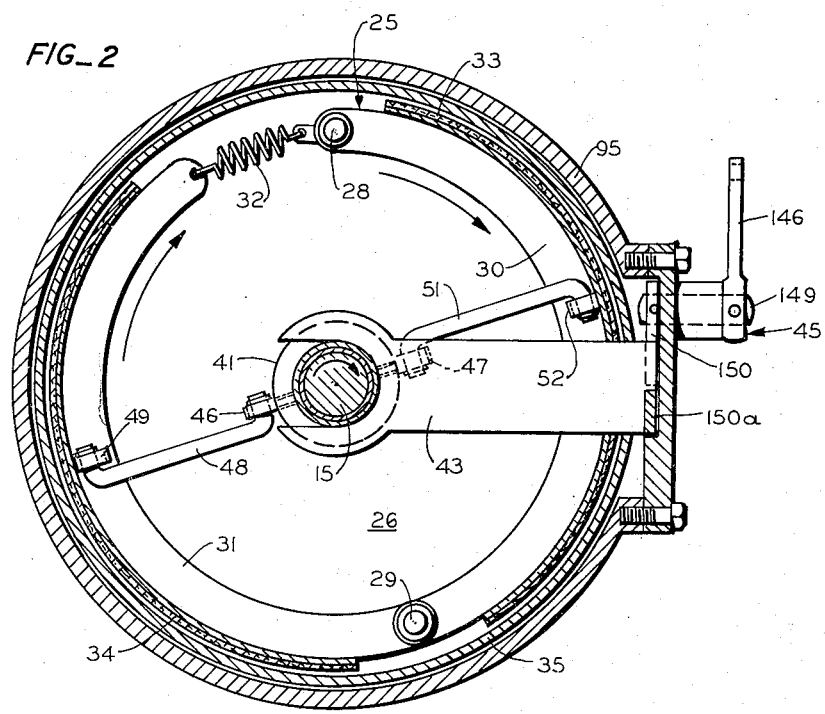
FIG_3
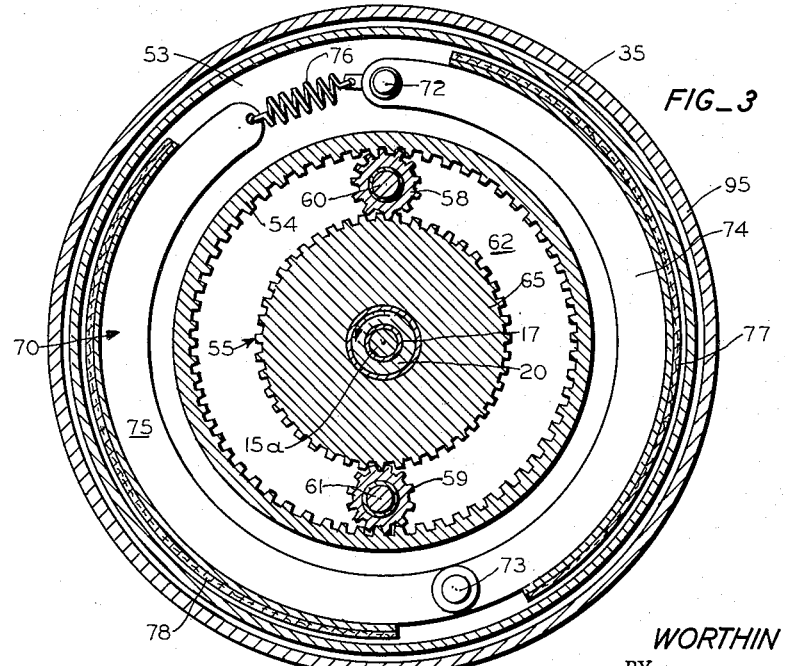
INVENTOR.
WORTHIN F. GRATTAN
BY
Jack M. Wiseman
ATTORNEY Dec. 31, 1963  W. F. GRATTAN  3,115,792
AUTOMATIC TRANSMISSION FOR AUTOMOTIVE VEHICLES
Filed Dec. 26, 1961  3 Sheets-Sheet 3
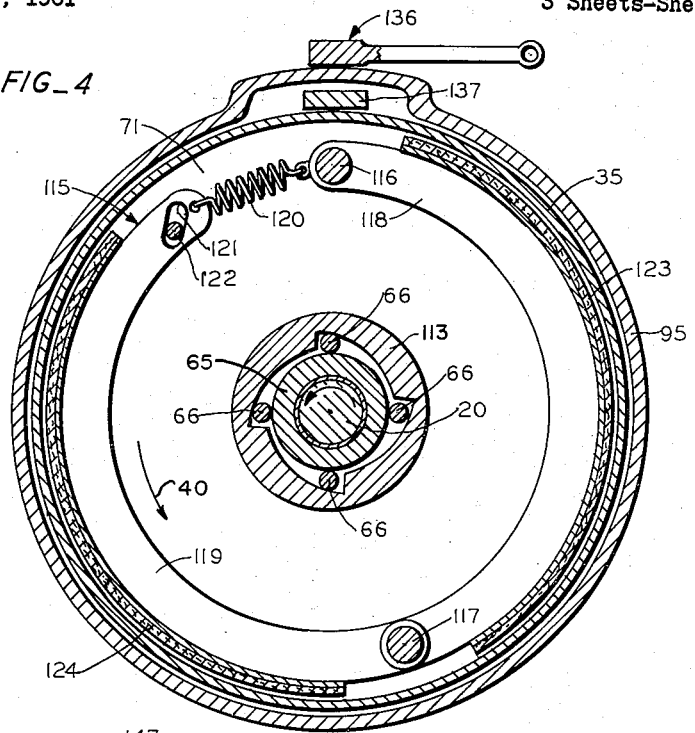
FIG_4
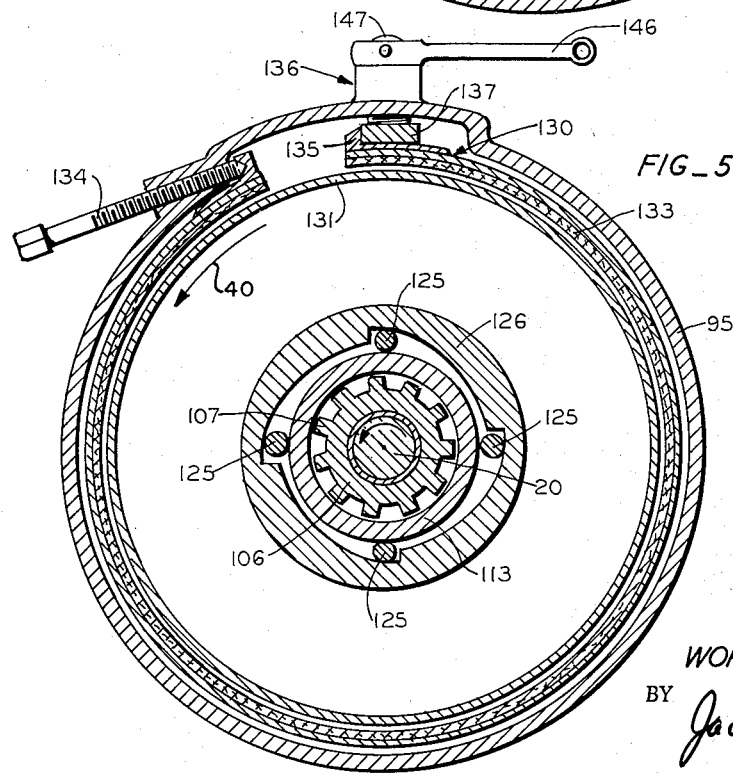
FIG_5
INVENTOR.
WORTHIN F. GRATTAN
BY Jack M. Wiseman
ATTORNEY

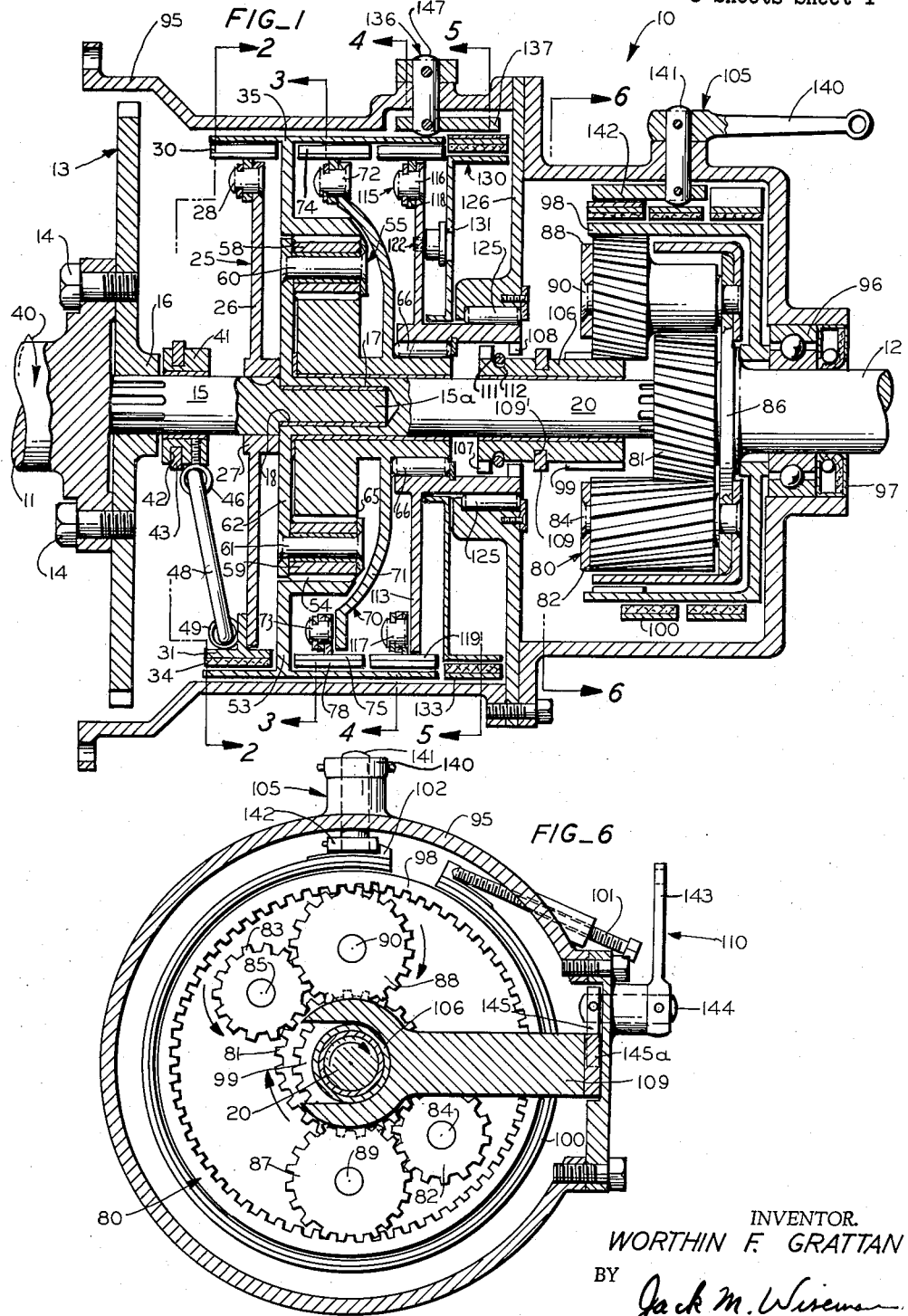

United States Patent Office 3,115,792
Patented Dec. 31, 1963

3,115,792
AUTOMATIC TRANSMISSION FOR AUTOMOTIVE VEHICLES
Worthin F. Grattan, Santa Clara County, Calif.
(22450 Summit Road, Los Gatos, Calif.)
Filed Dec. 26, 1961, Ser. No. 161,797
4 Claims. (Cl. 74—752)

The present invention relates to automatic transmissions for automotive vehicles.

An object of the present invention is to provide an automatic transmission for automotive vehicles which affords an operator positive control over the speed and acceleration of the vehicle and enables improved control over the vehicle by an operator while ascending or descending steep grades.

Another object of the present invention is to provide an automatic transmission for automotive vehicles which improves the gradability and hill braking of the vehicle.

Another object of the present invention is to provide an automatic transmission wherein a clutch may be operated automatically or manually.

Another object of the present invention is to provide an automatic transmission with a manually operated clutch for down hill low speed and for being pushed to start the car.

Other and further objects and advantages of the present invention will be apparent to one skilled in the art from the following description taken in connection with the accompanying drawings, in which:

FIG. 1 is a diagrammatic longitudinal section of an automatic transmission embodying the present invention.

FIG. 2 is a transverse sectional view taken along line 2—2 of FIG. 1.

FIG. 3 is a transverse sectional view taken along line 3—3 of FIG. 1 to illustrate a first planetary gear train.

FIG. 4 is a transverse sectional view taken along line 4—4 of FIG. 1.

FIG. 5 is a transverse sectional view taken along line 5—5 of FIG. 1.

FIG. 6 is a transverse sectional view taken along line 6—6 of FIG. 1 showing a second planetary gear train.

Illustrated in FIG. 1 is the automatic transmission 10 of the present invention which is employed to establish a drive relationship between a drive shaft 11, such as an engine crankshaft of a vehicle, and a driven shaft 12. The driven shaft 12 is axially aligned with the drive shaft 11 and is connected through suitable differential gears, not shown, to the rear wheel of a vehicle for applying a torque thereto.

The transmission 10 comprises a disc 13 (FIG. 1) which is secured to the drive shaft 11 for rotation therewith by bolts 14. A stub shaft 15, which is aligned axially with the drive and driven shafts 11 and 12, has one end thereof received by a flanged hub 16 of the disc 13 and is splined to the cylindrical wall of the hub 16 for rotation with the disc 13. At the other end of the stub shaft 15 is located a decreased diameter section 15a, which is received by a suitable sleeve bearing 17. The sleeve bearing 17 is disposed within a cylindrical bore 18 formed in one end of an intermediate shaft 20. The intermediate shaft 20 is aligned axially with the shafts 11, 12 and 15. Thus, the other end of the stub shaft 15 is supported by the intermediate shaft 20 for rotation independently of the intermediate shaft 20.

An automatic and manually operated clutch 25 (FIGS. 1 and 2) is disposed radially to the stub shaft 15 and comprises a clutch plate 26 with a flanged hub 27. The hub 27 receives the stub shaft 15 and has the cylindrical wall thereof keyed to the stub shaft 15, whereby the clutch plate 26 rotates with the stub shaft 15. Pivotally attached to the clutch plate 26 is a pin 28 that mounts a pair of arcuate clutch shoes 30 and 31 for movement relative to the clutch plate 26. Adjacent lower ends of the shoes 30 and 31 are retained by a pivot pin 29, while confronting upper ends of the shoes 30 and 31 are interconnected by a tension spring 32. Glued to the exterior surface of the clutch shoes 30 and 31 or otherwise caused to adhere thereto are arcuate clutch bands 33 and 34. Encircling the clutch shoes 30 and 31 is a clutch drum 35.

When the clutch 25 operates automatically, it functions as a centrifugal clutch with self-energizing shoes. The rotation of the drive shaft 11 in the clockwise direction, as shown by an arrow 40 (FIG. 1), imparts a rotary movement to the disc 13 in the same direction. Rotation of the disc 13, in turn, causes the stub shaft 15 to rotate in the clockwise direction (FIGS. 1 and 2). This action then effects a clockwise rotation of the clutch plate 26. The spring 32 normally holds the clutch shoes 30 and 31 out of engagement with the clutch drum 35. After the clutch plate 26 rotates in excess of a predetermined rotary speed, the force of the spring 32 is overcome and the clutch shoes 30 and 31 move outwardly against the urgency of the spring 32 into engagement with the clutch drum 35.

The clutch 25 may also be operated manually. For this purpose, the clutch 25 includes a collar 41 (FIGS. 1 and 2) that is supported by the stub shaft 15 and is slidable in the axial direction relative to the stub shaft 15. Formed in the collar 41 is an annular groove 42. A shifting fork 43 is received by the annular groove 42 and by means of a mechanical linkage 45 may be actuated to impart movement to the collar 41 in a direction axially of the stub shaft 15.

Secured to the collar 41 by screws at diametrically opposite locations thereof are ears 46 and 47 (FIGS. 1 and 2). A U-shaped link 48 has one leg thereof received by the ear 46 and has the other leg thereof received by an ear 49. The ear 49 is fixed to the shoe 31. The legs of the link 48 are freely rotatable within the openings of the ears 46 and 49. However, suitable means are provided to prevent the legs of the link 48 from being removed from the ears 46 and 49. In a similar manner, a U-shaped link 51 (FIG. 2) has one leg thereof received by the ear 47 and has the other leg thereof received by an ear 52. The ear 52 is fixed to the shoe 30 at a diametrically opposite location from the ear 49. The legs of the link 51 are freely rotatable within the openings of the ears 47 and 52. However, suitable means are provided to prevent the legs of the link 51 from being removed from the ears 47 and 52.

While the collar 41 is disposed in the position shown in FIG. 1, the clutch shoes 30 and 31 are not in engagement with the clutch drum 35, unless through the previously described centrifugal action. When the shifting fork 43 is actuated to move the collar 41 toward the driven shaft 12, the links 48 and 51 urge the shoes 30 and 31 against the action of the spring 32 into engagement with the clutch drum 35. To manually remove the clutch shoes 30 and 31 from engagement with the clutch drum 35, after manually shifted into engagement with the clutch drum 35, the shifting fork 43 is actuated to move the collar 41 toward the drive shaft 11.

Fixedly secured to the clutch drum 35 for rotation therewith is an annular disc 53 (FIG. 1) with a reduced cylindrical extension that is formed into an internal ring gear 54 (FIGS. 1 and 3) of a planetary gear train 55. Meshing with the ring gear 54 at diametrically opposite locations are planet gears 58 and 59 of the planetary gear train 55. The planet gears 58 and 59 are supported for rotation by spindles 60 and 61, respectively, which are mounted on a planet carrier 62. As shown in FIG. 1, the planet carrier 62 is fixed to the intermediate shaft 20, whereby rotation of the planet carrier 62 imparts a turning moment or torque to the intermediate shaft 20 for rotating the same therewith.

Disposed in meshing engagement with the planet gears 58 and 59 is an inner or sun reactor gear 65 (FIGS. 1 and 3), which includes a hub that receives the intermediate shaft 20 for free rotation thereabout. In engagement with the hub of the sun reactor gear 65 is a one-way clutch 66 (FIGS. 1 and 4), which prevent the rotation of the reactor gear 65 only in the clockwise direction relative to the clutch plate 113 as shown in FIG. 4. The one-way clutch 66 will prevent the reactor gear 65 from rotating in a direction opposite to the direction of the arrow 40.

Associated with the planetary gear train 55 is a centrifugal clutch 70 (FIG. 1 and 3), which comprises a bowl-shaped clutch plate 71 that is fixedly secured to the hub of the sun reactor gear 65 for rotation therewith. Pivotally attached to the clutch plate 71 a pin 72 that mounts a pair of arcuate clutch shoes 74 and 75 for movement lative to the clutch plate 71. Adjacent lower ends of the shoes 74 and 75 are retained by a pivot pin 73, while confronting upper ends of the shoes 74 and 75 are interconnected by a tension spring 76 (FIG. 3). Glued to the exterior surface of the clutch shoes 74 and 75 or otherwise caused to adhere thereto are arcuate clutch bands 77 and 78. The clutch drum 35 encircles the clutch shoes 74 and 75.

The spring 76 normally holds the clutch shoes 74 and 75 out of engagement with the clutch drum 35. After the clutch plate 71 rotates in excess of a predetermined rotary speed, the force of the spring 76 is overcome and the clutch shoes 74 and 75 move outwardly against the urgency of the spring 76 into engagement with the clutch drum 35.

As previously described, the engagement of the clutch 25, either automatically or manually, imparts a rotary movement to the clutch drum 35 in the direction of the arrow 40 (FIG. 1). By rotating the clutch drum 35, the ring gear 54 tends to rotate the planet gears 58 and 59 in the direction of the arrow 40 about the axis of the spindles 60 and 61, respectively. The planet gears 58 and 59, in turn, urge the sun reactor gear 65 to rotate in a direction opposite from the direction of the arrow 40. However, the sun reactor gear 65 is held by the one-way clutch 66 against rotation in the direction opposite to the arrow 40. As a consequence thereof, the planet gears 58 and 59 are constrained to travel about the sun reactor gear 65 to rotate the planet carrier 62 in the direction of the arrow 40. This action imparts a rotary movement to the intermediate shaft 20 in the direction of the arrow 40 with a 1.8 to 1 torque ratio.

The torque applied to the intermediate shaft 20 is transmitted to a second planetary gear train 80 (FIGS. 1 and 6), which comprises a sun gear 81. The sun gear 81 is splined to the intermediate shaft 20 for rotation therewith and meshes with planet gears 82 and 83. Supporting the planet gears 82 and 83 for individual rotation are spindles 84 and 85, respectively, which are carried at diametrically opposite locations by a planet carrier 86 (FIG. 1).

The planet gears 82 and 83, which are long and narrow, extend beyond the sun gear 81 and mesh with planet gears 87 and 88 (FIG. 6), respectively, which are short and wide. Supporting the planet gears 87 and 88 for individual rotation are spindles 89 and 90, respectively, which are carried at diametrically opposite locations by the planet carrier 86 (FIG. 1). The planet carrier 86 has the hub thereof fixed to the driven shaft 12 for imparting a rotary movement thereto. As shown in FIG. 1, the end of the shaft 12 is supported within a stepped, cylindrical transmission housing 95 by ball bearings 96 and is surrounded by a suitable seal 97.

For controlling the operation of the planetary gear train 80, the planetary gear train 80 includes concentrically disposed reactor gears 98 and 99 (FIGS. 1 and 6). The outer reactor gear 98 constitutes a ring gear, which is in continuous engagement with the planet gears 87 and 88, and is supported for free rotation about the driven shaft 12. The inner reactor gear 99, which is in the form of a sun gear, is supported for free rotation about the axis of the intermediate shaft 20 and is in continuous engagement with the planet gears 87 and 88.

A brake band 100 is arranged to engage the exterior surface of the ring reactor gear 98 (FIGS. 1 and 6). One end of the brake band 100 is anchored by means of an adjustment screw 101 (FIG. 6) that is received in threaded engagement by a suitable threaded opening formed in the stationary transmission housing 95. At the other end of the brake band 100 is disposed a tab 102 (FIG. 6). The brake band 100 can be manually shifted to a position engaging the outer reactor gear 98 and to a position free from engagement with the reactor gear 98 by a linkage mechanism 105 (FIGS. 1 and 6).

The sun reactor gear 99 is formed on one end of a sleeve 106 (FIG. 1), which is supported by the intermediate shaft 20 for free rotation thereabout and is slidable axially relative to the shaft 20. At the opposite end of the sleeve 106 are formed radially projecting teeth 107 (FIGS. 1 and 5). When the sleeve 106 is moved axially toward the driven shaft 12, the teeth 107 mesh with radially projecting teeth 108 and when the sleeve 106 is in the position shown in FIG. 1, the teeth 107 are out of engagement with the teeth 108.

For shifting the sleeve 106 axially, whereby the teeth 107 and 108 are brought into or out of engagement, an annular groove 109' is formed in the sleeve 106. The groove 109' receives a shifting fork 109 (FIG. 6), which is actuated by a mechanical linkage 110 for shifting the sleeve 106 axially relative to the intermediate shaft 20. When the sleeve 106 is moved to its respective positions a conventional synchronizing spring 111 (FIG. 1) disposed within a groove 112 adjacent the projecting teeth 107 minimizes chattering from the mating of the teeth 107 and 108.

The teeth 108 are formed on the hub of a clutch plate 113 (FIG. 1), which also carries the previously mentioned one-way clutch 66. The clutch plate 113 is an element of a centrifugal clutch 115 (FIGS. 1 and 4) that is associated with the planetary gear train 80. Pivotally attached to the clutch plate 113 is pin 116 that mounts a pair of arcuate clutch shoes 118 and 119 for movement relative to the clutch plate 113. Adjacent lower ends of the shoes 118 and 119 are retained by a pivot pin 117, while confronting upper ends of the shoes 118 and 119 are interconnected by a tension spring 120 (FIG. 4). Formed in the shoe 119 is a parallelogram opening 121 (FIG. 4), which receives a release pin 122 that projects through the clutch plate 113. Glued to the exterior surface of the clutch shoes 118 and 119 or otherwise caused to adhere thereto are arcuate clutch bands 123 and 124, respectively. The previously mentioned clutch drum 35 encircles the clutch shoes 118 and 119.

The spring 120 normally holds the clutch shoes 118 and 119 out of engagement with the clutch drum 35. After the clutch plate 113 rotates in excess of a predetermined rotary speed, the force of the spring 120 is overcome and the clutch shoes 74 and 75 move outwardly against the urgency of the spring 120 into engagement with the clutch drum 35.

Disposed in engagement with the hub of the clutch plate 113 is a one-way brake 125 (FIGS. 1 and 5), which permit the clutch plate 113 to rotate only in the clockwise direction or in the direction of the arrow 40 (FIG. 1). The one-way brake 125 will prevent the clutch plate 113 from rotating in a counterclockwise direction or in a direction opposite to the direction of the arrow 40. For holding the one-way brake 125, a cage 126 is provided which is fixed to the transmission housing 95 by bolts.

For releasing the centrifugal clutch 115 manually, when the clutch 115 has been engaged automatically, a release mechanism 130 (FIGS. 1 and 5) is provided. The release mechanism 130 comprises a brake drum 131 which is carried on the hub of the clutch plate 113. Encircling the brake drum 131 is a wrap-around brake band 133 (FIGS. 1 and 5), which is adapted for movement into and out of engagement with the brake drum 131. One end of the brake band 133 is anchored by means of an adjustment screw 134 (FIG. 5) that is received in threaded engagement by a suitable threaded opening formed in the stationary transmission housing 95. At the other end of the brake band 133 is disposed a tab 135. The brake band 133 can be manually shifted to a position engaging the brake drum 131 and to a position free from engagement with the brake drum 131 by a linkage mechanism 136.

When the accelerator pedal, not shown, of the vehicle is fully depressed, the linkage mechanism 136 by means of a cam 137 causes the brake band 133 to engage the brake drum 141, thereby stopping the rotation of the brake drum 131 and the clutch plate 113. As a result thereof, the spring 120 of the clutch 115 withdraws the clutch shoes 118 and 119 from engagement with the clutch drum 35 to release the clutch 115. It is apparent that subsequent release of the accelerator pedal of the vehicle will effect reengagement of the centrifugal clutch 115 if the speed is sufficient.

The brake band 100 surrounding the outer reactor gear 98, the axial shifting of the sleeve 106 by the shifting fork 109, the shifting of the collar 41 by shifting fork 43 are controlled by linkages 105, 110 and 45, respectively, in a conventional manner by a well-known shifting lever, not shown, that is supported on the steering post of a vehicle. The shifting lever is provided with the following positions: neutral, drive, reverse, and clutch lock. A lever 146 attached to a pull out handle on the dash or a lever under the dash causes engagement of the clutch shoes 30 and 31 (FIG. 2).

More particularly, the linkage 105 connected to the shifting lever includes a lever 140 (FIGS. 1 and 6), which is fixed to one end of an upright shaft 141 that is received by the stationary housing 95 for rotation. At the lower end of the shaft 141 is fixed a cam 142. Rotation of the shaft 141 activates the cam 142 to cause the brake band 100 by actuating the tab 102 to engage or disengage the exterior surface of the outer reactor gear 98 dependent upon the direction of rotation of the shaft 141.

The shifting lever, not shown, is also arranged through linkage 110 (FIG. 6), to shift axially the control sleeve 106. For this purpose, the linkage 110 includes a lever 143 that is fixed to one end of a horizontally disposed shaft 144, which is supported by the housing 95 for rotation. At the other end of the shaft 144 is attached a cam 145. Rotation of the shaft 144 by the lever 143 causes the cam 145 to rotate, thereby actuating a bar 145a that is operatively connected to the shifting fork 109. Movement of the shifting fork 109 in an axial direction imparts a like movement to the control sleeve 106.

The mechanical linkage 136 (FIGS. 1 and 5) is controlled by the accelerator pedal, not shown, for engaging or disengaging the brake band 133 with the brake drum 131 and includes a lever 146. The lever 146 is fixed to one end of an upright shaft 147 that is received by the stationary housing 95 for rotation. At the lower end of the shaft 147 is fixed the cam 137. Rotation of the shaft 147 activates the cam 137 to cause the brake band 133 to engage or disengage the brake drum 131 dependent upon the direction of rotation of the shaft 147.

For this purpose, the linkage 45 includes the lever 146 (FIG. 2) that is fixed to one end of a horizontally disposed shaft 149, which is supported by the housing 95 for rotation. The control lever 146 is attached by linkage to the dash pull out handle. At the other end of the shaft 149 is attached a cam 150. Rotation of the shaft 149 by the lever 146 causes the cam 150 to rotate, thereby actuating a bar 150a that is operatively connected to the shifting fork 43. Movement of the shifting fork 43 in an axial direction imparts a like movement to the collar 41.

As previously described, the torque multiplication produced by the planetary gear train 55 is 1.8. Similarly, the torque multiplication produced by the planetary gear train 80 is 1.8. The total torque multiplication is 3.24. When the centrifugal clutch 70 is engaged, the planetary gear train 55, in effect, is by-passed. While the centrifugal clutch 115 is engaged, the planetary gear train 80 is, in effect, by-passed. When both clutches 70 and 115 are engaged, a direct drive, in effect, is established between the drive shaft 11 and the driven shaft 12 and the torque ratio is 1 to 1.

The operation of the automatic gear transmission 10 will now be described. When the shifting lever, not shown, is in the neutral position, the brake band 100 and the sleeve 106 are in the positions shown in FIG. 1. That is, the brake band 100 is not in engagement with the outer reactor gear 98 of the planetary gear train 80 and the teeth 107 of the sleeve 106 are not meshing with the teeth 108. The drive shaft 11 is rotating in the direction shown by the arrow 40 (FIG. 1). In turn, the disc 13, the stub shaft 15 and the clutch plate 26 of the clutch 25 are also rotating in the direction of the arrow 40.

When the clutch plate 26 (FIG. 1) is rotating above a predetermined speed, the clutch shoes 30 and 31 (FIGS. 1 and 2) move into engagement with the clutch drum 35 against the urgency of the spring 32 and, hence, the clutch 25 is in engagement. After the clutch 25 is engaged, the drum 35 rotates therewith in the direction of the arrow 40 and the ring gear 54 (FIGS. 1 and 3) of the planetary gear train 55 imparts clockwise rotation to the planet gears 58 and 59 about their respective spindles. The rotation of the planet gears 58 and 59 urges the sun reactor gear 65 to rotate in the counterclockwise direction. However, the sun reactor gear 65 is held by the one-way clutch 66 against counterclockwise rotation. As a consequence thereof, the planetary gears 58 and 59 are constrained to travel about the sun reactor gear 65 to rotate the planet carrier 62 in the direction of the arrow 40.

The rotation of the planet carrier 62 imparts rotation to the intermediate shaft 20 in the direction of the arrow 40. This action, in turn, imparts a clockwise rotation to the sun gear 81 (FIGS. 1 and 6) of the planetary gear train 80. The clockwise rotation of the sun gear 81 imparts a counterclockwise rotation to the planet gears 82 and 83, which, in turn, rotate the planet gears 87 and 88 in the clockwise direction. By rotating the planet gears 87 and 88 in the clockwise direction, the reactor gear 98 rotates in the clockwise direction and the reactor gear 99 rotates in the counterclockwise direction. Since the reactor gears 98 and 99 are free to rotate, no reactive force is provided to rotate the planet carrier 86. Thus, no rotary motion is imparted to the driven shaft 12 and the vehicle will remain stationary with the vehicle engine idling.

If the shifting lever, not shown, is moved to the reverse position, the linkage mechanism 105 (FIGS. 1 and 6) actuates the cam 142 to press the brake band 100 into engagement with the exterior surface of the ring reactor gear 98 of the planetary gear train 80.

As previously described in connection with the neutral position, power is transmitted through the planetary gear train 55 and the intermediate shaft 20 to effect rotation of the sun gear 81 of the planetary gear train 80 in the clockwise direction. This action causes rotation of the planet gears 82 and 83 in the counterclockwise direction, which, in turn, causes the planet gears 87 and 88 to rotate in the clockwise direction. Since the ring gear 98 is held stationary by the brake band 100, the planet gears 87 and 88 in mesh therewith are constrained to travel in an epicyclic manner around the ring gear 98 in a counterclockwise or reverse direction of travel. As a consequence thereof, the planet carrier 86 imparts a counterclockwise or reverse direction of rotation to the driven shaft 12.

When the shifting lever, not shown, is moved to the drive position, the brake band 100 is not in engagement with the outer reactor gear 98. However, the linkage mechanism 110 (FIG. 6) is actuated to move the sleeve 106 (FIG. 1) axially to the right (as viewed in FIG. 1) until the teeth 107 and 108 mesh. Then, the outer reactor gear 98 is free to rotate and the inner reactor gear 99 of the sleeve 106 is held against counterclockwise rotation by the one-way brake 125.

Power is applied from the driven shaft 11 through the planetary gear train 55 to the intermediate shaft 20 and the sun gear 81 fixed to the end thereof. The rotation of the sun gear 81 in the clockwise direction rotates the planet gears 82 and 83 in the counterclockwise direction, which, in turn, causes the planet gears 87 and 88 to rotate in the clockwise direction. The planet gears 87 and 88 mesh with the sun reactor gear 99 to urge the same to rotate in the counterclockwise direction. Since the inner reactor gear 99 is held against counterclockwise rotation by the one-way brake 125, the planet gears 87 and 88 travel around the sun reactor gear 99 in the clockwise direction. Hence, the planet carrier 86 rotates in the clockwise direction to impart forward or clockwise rotation to the driven shaft 12.

As previously described, the planetary gear trains 55 and 80 produce a high starting torque. After the vehicle has attained sufficient speed, it is desirable to establish a direct drive between the drive and driven shafts and effectively by-pass the planetary gear trains 55 and 80. This is accomplished through the centrifugal clutches 70 and 115, respectively.

After a predetermined forward speed of the vehicle has been obtained, the operator of the vehicle momentarily releases the accelerator pedal. This action reduces the input torque or power. As a consequence thereof, a reverse power flow through the transmission 10 is temporarily obtained, since the momentum of the vehicle causes the driven shaft 12 to function as a drive element. Thereupon, the sun gear 81 slows down to rotate the planet gears 82 and 83 in the clockwise direction, which results in the planet gears 87 and 88 rotating in the counterclockwise direction. Thereupon, the sun reactor gear 99 rotates in the clockwise direction. As a consequence thereof, the control sleeve 106 and the clutch plate 113 rotate in the clockwise direction.

The rotation of the clutch plate 113 and the one-way clutch 66 in the clockwise direction imparts a clockwise rotation to the clutch plate 71 of the clutch 70. When the rotary speed of the clutch plate 71 exceeds a predetermined rate, the centrifugal clutch 70 is engaged in a manner heretofore described in detail. The spring 76 of the clutch 70 is of a lesser urgency than the spring 120 of the clutch 115, whereby the clutch 70 is engaged at a lesser rotation speed than is required for the clutch 115.

While the clutch 70 is engaged, the planetary gear train 55 revolves as a unit with the clutch drum 35 and a one-to-one drive ratio is established between the drive shaft 11 and the intermediate shaft 20. The operator once again depresses the accelerator and the sun gear 81 will accelerate and drive the driven shaft 12 in the clockwise direction in the manner initially described.

Above a still higher vehicle speed, the accelerator is again released to effect a reverse power flow in the manner previously described, but at a higher rotative speed of the control sleeve 106 and the clutch plate 113. When the rotary speed of the clutch plate 113 exceeds a predetermined rate, the centrifugal clutch 115 is engaged in a manner previously described.

While the centrifugal clutch 115 is engaged, the sun reactor gear 99, the sun gear 81, the clutch drum 35 and the intermediate shaft 20 rotate at the same speed. Thus, the planetary gear train 80 is locked as a unit, whereby there is no torque multiplication through the transmission 10 and the shafts 11 and 12 rotate at the same speed.

In the event an operator desires to reestablish temporarily a higher torque ratio between the driven and drive shafts, such as for hill climbing, the operator temporarily depresses fully the accelerator pedal. Thereupon, the linkage 136 is actuated to cause the brake band 133 of the release mechanism 130 to engage the brake drum 131. As a result thereof the clutch shoe 119 is pulled inwardly by the pin 122 and the clutch 115 is restrained from rotating by the brake drum 131 through the pin 122. The spring 120 urges the clutch shoes 118 and 119 to disengage the clutch drum 35, thereby disengaging the clutch 115. Upon disengaging the clutch 115, the flow of power is reestablished through the planetary gear train 55. Subsequent release of the accelerator pedal will effect reengagement of the centrifugal clutch 115 and a resultant reestablishment of the one-to-one torque ratio.

As previously described, torque is transmitted from the stub shaft 15 to the planetary gear train 55 through the centrifugal clutch 25. The clutch 25 is engaged for transmitting the torque to the gear train 55 when the rotation of the clutch plate 26 thereof exceeds a predetermined rate of speed. If the vehicle is to be pushed to start an engine or low speed down hill driving, it is desired that the clutch 25 be engaged, although the speed of rotation of the clutch plate 26 is insufficient to maintain the clutch shoes 30 and 31 in engagement with the clutch drum 35. For this purpose, an operator pulls out the handle on the dash into clutch lock position. In response thereto, the linkage mechanism 45 is actuated to cause the shifting fork 43 to move the collar 41 axially toward the right as viewed in FIG. 1. The result thereof is to cause manually the engagement of the clutch shoes 30 and 31 with the clutch drum 35, thereby engaging the clutch 25. The clutch 25 will remain engaged until the handle on the dash is pushed into clutch lock position, the collar 41 is returned to its initial position, which is shown in FIG. 1. When the collar 41 is returned to its initial position, the centrifugal clutch 25 will operate in the manner previously described.

It is to be understood that modifications and variations of the embodiment of the invention disclosed herein may be resorted to without departing from the spirit of the invention and the scope of the appended claims.

Having thus described my invention, what I claim as new and desire to protect by Letters Patent is:

1. An automatic gear transmission for transmitting rotary power from a first shaft to a second shaft comprising an internal ring gear, a reactor gear mounted concentrically with said ring gear for rotation in one direction, planet gears meshing with said ring and reactor gears, a planet carrier supporting said planet gears for rotation and connected to said second shaft for imparting a rotary movement thereto, a centrifugal clutch rotated in response to the rotation of said first shaft, and means connected to said ring gear and engaged by said centrifugal clutch in response to said centrifugal clutch rotating above a predetermined rotary speed for rotating said internal ring gear.

2. An automatic gear transmission for transmitting rotary power from a first shaft to a second shaft comprising an internal ring gear, a reactor gear mounted concentrically with said ring gear for rotation in one direction, planet gears meshing with said ring and reactor gears, a planet carrier supporting said planet gears for rotation and connected to said second shaft for imparting a rotary movement thereto, a centrifugal clutch rotated in response to the rotation of said first shaft, first means connected to said ring gear and automatically engaged by said centrifugal clutch in response to the rotation of said centrifugal clutch above a predetermined rotary speed for rotating said internal ring gear, and means connected to said centrifugal clutch and manually operable to engage said centrifugal clutch with said first means for rotating said internal ring gear when said centrifugal clutch rotates at speeds below said predetermined rotary speed.

3. An automatic gear transmission for transmitting rotary power from a drive shaft to a driven shaft comprising a centrifugal clutch, means for rotating said centrifugal clutch in response to the rotation of said drive shaft, rotating means engaged by and rotated by said centrifugal clutch in response to said centrifugal clutch rotating above a predetermined rotary speed, a first planetary gear train operated in response to the rotation of said rotating means, a second planetary gear train spaced from said first planetary gear train, means coupling the output of said first planetary gear train with the input of said second planetary gear train for activating said second planetary gear train, means coupling said second planetary gear train with said driven shaft for imparting rotary movement to said driven shaft, a reactor element for each of said planetary gear trains, and means automatically operative to couple said reactor elements with said rotating means, whereby said planetary gear trains are constrained to rotate as units to effect a direct drive between said drive and driven shafts upon establishment of a reverse power flow from said driven shaft through said second planetary gear train.

4. An automatic gear transmission for transmitting rotary power from a drive shaft to a driven shaft comprising a centrifugal clutch, means for rotating said centrifugal clutch in response to the rotation of said drive shaft, rotating means engaged by and rotated by said centrifugal clutch in response to said centrifugal clutch rotating above a predetermined rotary speed, a first planetary gear train operated in response to the rotation of said rotating means, a second planetary gear train spaced from said first planetary gear train, means coupling the output of said first planetary gear train with the input of said second planetary gear train for activating said second planetary gear train, means coupling said second planetary gear train with said driven shaft for imparting rotary movement to said driven shaft, a reactor element for each of said planetary gear trains, means automatically operative to couple said reactor elements to said rotating means, whereby said planetary gear trains are constrained to rotate as units to effect a direct drive between said drive and driven shafts upon establishment of a reverse power flow from said driven shaft through said second planetary gear train, and means connected to said centrifugal clutch and manually operable to engage said centrifugal clutch with said rotating means for operating said first planetary gear train when said centrifugal clutch rotates at speeds below said predetermined rotary speed.

References Cited in the file of this patent

UNITED STATES PATENTS

| | | |
|---|---|---|
| 2,127,719 | Dodge | Aug. 23, 1938 |
| 2,348,716 | Banker | May 16, 1944 |
| 2,355,710 | Dodge | Aug. 15, 1944 |
| 2,500,763 | Lowndes | Mar. 14, 1950 |
| 2,763,350 | Klaue | Sept. 18, 1956 |
| 2,891,421 | Grattan | June 23, 1959 |
| 3,063,309 | Grattan | Nov. 13, 1962 |